United States Patent
Tsuchitoi

(10) Patent No.: US 10,091,200 B2
(45) Date of Patent: Oct. 2, 2018

(54) INFORMATION PROCESSING APPARATUS, POLICY MANAGEMENT APPARATUS, SECURITY POLICY MANAGEMENT METHOD, AND STORAGE MEDIUM

(71) Applicant: CANON KABUSHIKI KAISHA, Tokyo (JP)

(72) Inventor: Naoki Tsuchitoi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 14/992,877

(22) Filed: Jan. 11, 2016

(65) Prior Publication Data

US 2016/0212130 A1    Jul. 21, 2016

(30) Foreign Application Priority Data

Jan. 15, 2015    (JP) .................................. 2015-005582

(51) Int. Cl.
    *H04L 29/06*    (2006.01)
(52) U.S. Cl.
    CPC .............. *H04L 63/10* (2013.01); *H04L 63/20* (2013.01)
(58) Field of Classification Search
    CPC ........................................................ H04L 63/10
    USPC .......................................................... 726/1
    See application file for complete search history.

(56) References Cited

U.S. PATENT DOCUMENTS

| | | | | |
|---|---|---|---|---|
| 6,947,726 | B2 * | 9/2005 | Rockwell | H04L 29/06 455/411 |
| 8,028,334 | B2 * | 9/2011 | Andreev | H04L 63/0263 726/11 |
| 8,443,433 | B2 * | 5/2013 | Abzarian | G06F 21/577 726/11 |
| 2016/0212130 | A1 * | 7/2016 | Tsuchitoi | H04L 63/20 |

FOREIGN PATENT DOCUMENTS

| | | | |
|---|---|---|---|
| JP | 2008299811 | A | 12/2008 |
| JP | 495-9425 | * | 6/2012 |
| JP | 4959425 | B2 | 6/2012 |
| KR | 10-2010-0126617 | A | 12/2010 |
| KR | 101283884 | B1 | 8/2013 |

* cited by examiner

*Primary Examiner* — Longbit Chai
(74) *Attorney, Agent, or Firm* — Canon U.S.A., Inc. IP Division

(57) ABSTRACT

When an expanded application (AP) is installed, an information processing apparatus analyzes port control information relating to a unique port to be used by the expanded AP and edits policy setting items including existing policy setting items based on the port control information. Then, the information processing apparatus receives setting input via the edited policy setting items and generates setting information. The information processing apparatus applies a filtering rule to a firewall (FW) unit according to the setting information, whereby the security is maintained in the case where the expanded AP is installed.

18 Claims, 18 Drawing Sheets

FIG.4

```
Application Name: ApplicationX
Application Version: 1.0.0
Application ID: 1234-5678-90ab-cdef
Manufacture: VenderA
PortID: 21000/TCP
Port Description: Print Server Port
PortID: 21001/UDP
Port Description: Administration Port
```

FIG.8

EDIT PORT OPEN POLICY

☐ PROHIBIT LPD (PORT NUMBER: 515)
☐ PROHIBIT RAW (PORT NUMBER: 9100)
☐ PROHIBIT FTP (PORT NUMBER: 21)
☐ PROHIBIT IPP (PORT NUMBER: 631)

UPDATE

FIG.9

| Policytext | Protocol | PortID |
|---|---|---|
| PROHIBIT ApplicationX Print Server Port (PORT NUMBER: 21000) | TCP | 21000 |
| PROHIBIT ApplicationX Administration Port (PORT NUMBER: 21001) | UDP | 21001 |

FIG.10

EDIT PORT OPEN POLICY

☐ PROHIBIT LPD (PORT NUMBER: 515)
☐ PROHIBIT RAW (PORT NUMBER: 9100)
☐ PROHIBIT FTP (PORT NUMBER: 21)
☐ PROHIBIT IPP (PORT NUMBER: 631)     1001
☐ PROHIBIT ApplicationX Print Server Port
   (PORT NUMBER: 21000)
☐ PROHIBIT ApplicationX Administration Port
   (PORT NUMBER: 21001)

UPDATE
1002

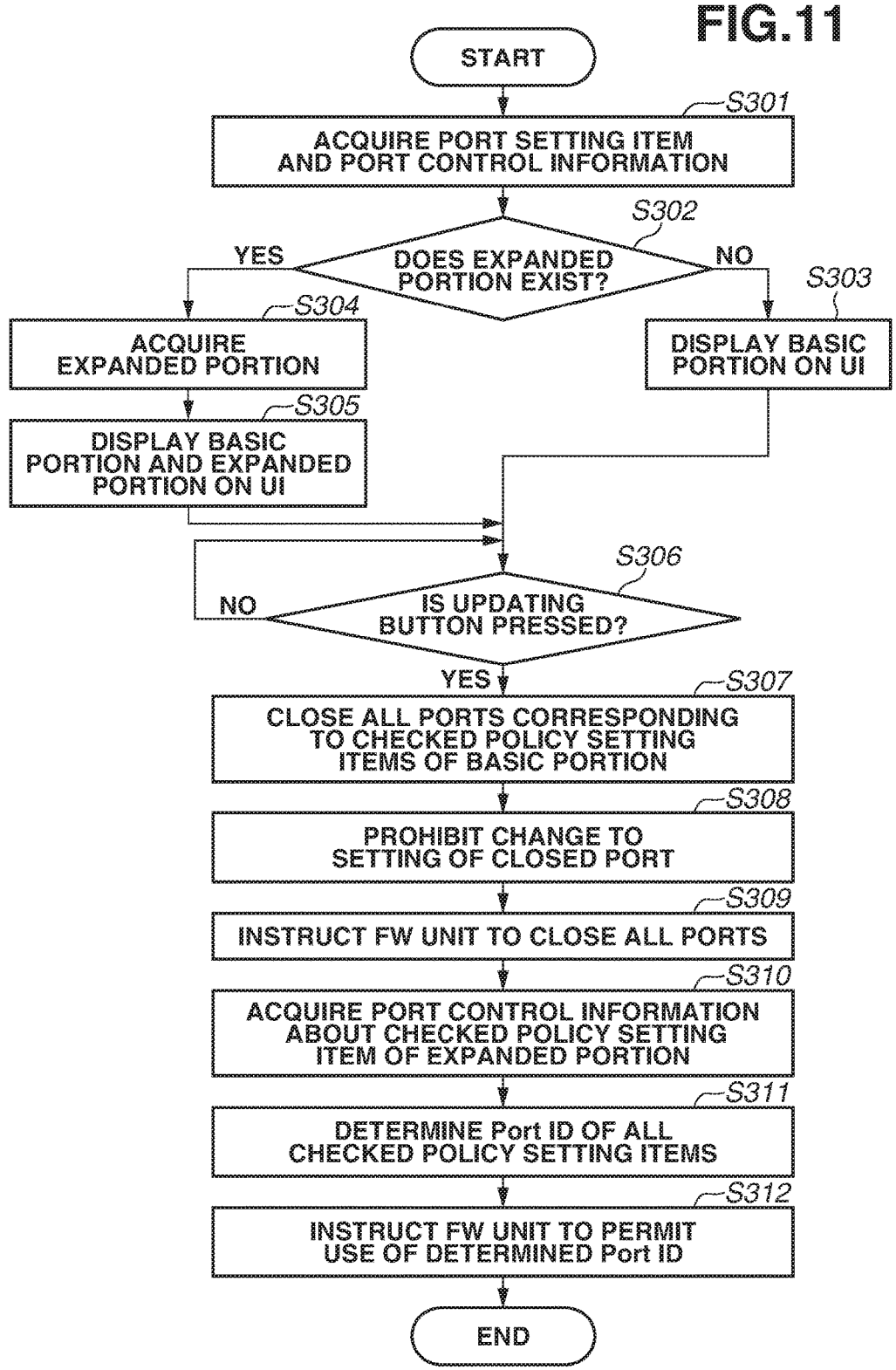

FIG.12

| SECURITY POLICY ITEM | FORCED SETTING ITEM | SETTING VALUE |
|---|---|---|
| PROHIBIT USER AUTHENTICATION USING PLAIN TEXT BY SERVER FUNCTION | USE FTP PRINTING<br>USE SSL IN EMAIL TRANSMISSION<br>USE SSL IN FILE SAVING | OFF<br>ON<br>ON |
| MANDATE VERIFICATION OF SERVER CERTIFICATE IN SSL COMMUNICATION | CONFIRM VALIDITY OF CERTIFICATE IN SSL COMMUNICATION FOR EMAIL TRANSMISSION<br>CONFIRM VALIDITY OF CERTIFICATE IN SSL COMMUNICATION FOR FILE SAVING | ON<br>ON |
| PROHIBIT LPD | SET LPD PRINTING | OFF |
| PROHIBIT RAW | SET RAW PRINTING | OFF |
| PROHIBIT FTP PRINTING | USE FTP PRINTING | OFF |
| PROHIBIT IPP PRINTING | USE IPP PRINTING | OFF |
| PROHIBIT USB STORAGE | USE USB STORAGE | OFF |

FIG.16

| Policytext | Protocol | PortID |
|---|---|---|
| PROHIBIT ApplicationY File Server Port (PORT NUMBER: 31000) | TCP | 31000 |

FIG.17

Application Name: ApplicationY

Application Version: 1.0.1

Application ID: 1234-5678-90ab-1234

Manufacture: VenderB

PortID: 31000/TCP

Port Description: File Server Port

FIG.18

EDIT SECURITY POLICY

ENCRYPTED COMMUNICATION POLICY
- ☐ PROHIBIT USER AUTHENTICATION USING PLAIN TEXT BY SERVER FUNCTION
- ☐ MANDATE VERIFICATION OF SERVER CERTIFICATE IN SSL COMMUNICATION

PORT OPEN POLICY
- ☐ PROHIBIT LPD (PORT NUMBER: 515)
- ☐ PROHIBIT RAW (PORT NUMBER: 9100)
- ☐ PROHIBIT FTP (PORT NUMBER: 21)
- ☐ PROHIBIT IPP (PORT NUMBER: 631)  *1801*
- ☐ PROHIBIT ApplicationX Print Server Port (PORT NUMBER: 21000)
- ☐ PROHIBIT ApplicationX Administration Port (PORT NUMBER: 21001)
- ☐ PROHIBIT ApplicationY File Server Port (PORT NUMBER: 31000)

*1802*

INTERFACE POLICY
- ☐ PROHIBIT USB STORAGE

[UPDATE] *1803*

INFORMATION PROCESSING APPARATUS, POLICY MANAGEMENT APPARATUS, SECURITY POLICY MANAGEMENT METHOD, AND STORAGE MEDIUM

BACKGROUND OF THE INVENTION

Field of the Invention

The present invention relates to an information processing system, a method of controlling the information processing system, and a program. In particular, the present invention relates to security policy technologies between devices in a network environment.

Description of the Related Art

Recent multifunction peripherals (MFPs) are equipped with a function of connecting to a network to provide a file service to a personal computer (PC), other MFP, etc. Specifically, recent MFPs include a server function similar to that of a file server or an authentication server existing on a network. Meanwhile, PCs and servers connected to office networks are required to operate according to a security policy determined for each office. The security policy refers to a basic policy of an entire organization that relates to security, security standards, individual procedures, etc. Thus, MFPs having a server function are also required to operate according to the security policy.

Port control of a network service or communication service (hereinafter, "service") is one of the security policies of devices having a server function. The service includes the Line PRinter daemon protocol (LPR), Internet Printing Protocol (IPP), File Transfer Protocol (FTP), etc. A port is a gateway for communication data between a service and an external apparatus, and a unique port number is set for each service. In other words, the port number can be said as identification information for the identification of the service. Predefined port numbers are set, e.g., No. 515 for LPR, No. 631 for IPP, No. 21 for FTP, etc. Meanwhile, the service often has protocol or implementation vulnerability. Thus, in order to prevent emergence of vulnerable elements, port control is commonly performed to close a port usable in a service that is not in use. Further, some of the recent MFPs are equipped with a firewall function in which arbitrary network communication is permitted or prohibited based on information about a destination address, a source address, a port number, a protocol, etc. In the firewall function, all kinds of information such as a destination address, etc. are manually set by using a filtering rule setting screen, etc.

Meanwhile, some of the foregoing types of MFPs provide not only pre-installed services but also a system for post hoc installation of an expanded application to add a service after the shipment of the MFP, in order to satisfy various client needs. An expanded application is an application (program (hereinafter, the application will be referred to as "AP")) that is installed post hoc. For example, there are cases where an expanded AP has a server function and performs a print service by using a unique port other than a port preset to the MFP. The security policy is desirably maintained even in the cases where an expanded AP is installed post hoc.

In relation to the foregoing point, Japanese Patent No. 4959425 discusses an information processing apparatus in which a security level is preset and in a case where an expanded AP is installed post hoc, a forced rule corresponding to the security level can be held in advance in the expanded AP. The information processing apparatus holds definitions of setting values corresponding to the security level, so that an operator can set security-related setting values by simply designating the security level.

However, in the information processing apparatus discussed in Japanese Patent No. 4959425, the setting values are set according to ports used by pre-installed services. This makes it difficult to flexibly control port of an expanded AP which is installed post hoc. Furthermore, in a case where a firewall function is used, although it is possible to perform control on an arbitrary port, it is difficult to determine in advance a port that is to be used by an expanded AP. This gives rise to a problem that it takes time to properly restrict the use of a port or that an inappropriate security policy is set. These problems commonly occur in not only MFPs but also information processing apparatuses capable of communicating with an external apparatus.

SUMMARY OF THE INVENTION

The present invention is mainly directed to a technique that ensures that port control based on a security policy is reliably performed even in a case where an application (AP) is installed post hoc.

According to an aspect of the present invention, an information processing apparatus includes a storage unit configured to store a policy setting item for setting a security policy when a port is used via which communication data is input to or output from an external apparatus, an installation unit configured to install an application, an analysis unit configured to analyze the installed application to generate port control information indicating the security policy relating to the port that is used by the installed application or the use of which by the installed application is restricted, and a setting unit configured to edit the policy setting item using the port control information generated by the analysis unit and generate setting information for performing control to open/close the port based on the edited policy setting item.

In the aspect of the present invention, when an AP is installed, the AP is analyzed to generate port control information. Policy setting items based on a security policy are edited using the port control information, and the edited policy setting items are displayed. Setting information for port opening/closing control is generated through the display. In this way, the port opening/closing control reflecting the security policy is reliably performed even in the case where the AP is installed post hoc.

Further features of the present invention will become apparent from the following description of exemplary embodiments with reference to the attached drawings.

BRIEF DESCRIPTION OF THE DRAWINGS

FIG. 4 illustrates an example of an expanded AP configuration file.

FIG. 8 illustrates an example of a UI screen displayed before installing an expanded AP.

FIG. 9 illustrates an example of an expanded portion of policy control information.

FIG. 10 illustrates an example of a policy setting item display screen displayed after the expansion.

FIG. 11 is a flow chart illustrating an entire procedure to be executed by a policy setting unit.

FIG. 12 illustrates an example of a forced rule.

FIG. 16 illustrates an example of port control information extracted from an installed expanded AP.

FIG. 17 illustrates an example of an expanded AP configuration file.

FIG. 18 illustrates an example of a policy setting item display screen according to the second exemplary embodiment.

DESCRIPTION OF THE EMBODIMENTS

Figure 1:
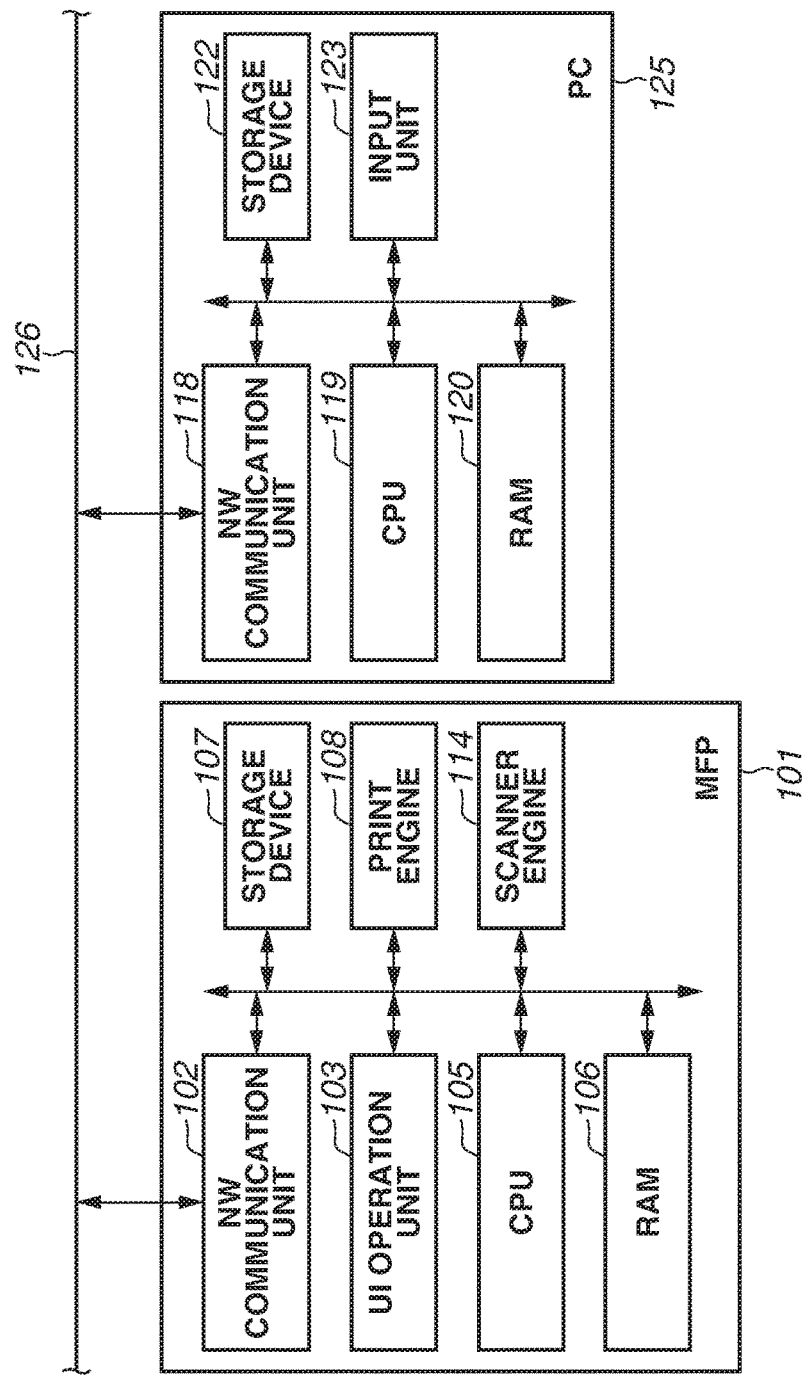
FIG. 1 is a hardware configuration diagram illustrating an information processing system according to a first exemplary embodiment.

The following describes a first exemplary embodiment of the present invention. FIG. 1 is a hardware configuration diagram illustrating an information processing system according to the first exemplary embodiment. The information processing system includes a multifunction peripheral (MFP) 101, a personal computer (PC) 125, and a network 126. The MFP 101 is an example of an information processing apparatus having a communication function. The network 126 is a communication path connecting the MFP 101 and the PC 125 to each other. While the first exemplary embodiment will be described with reference to the illustrated examples, apparatuses included in the information processing system are not limited to the examples illustrated in FIG. 1, and various types of apparatuses may be connected to the network 126. Further, the information processing apparatus may be an apparatus other than the MFP, such as a printer or a scanner.

The MFP 101 includes a network (NW) communication unit 102, a user interface (UI) operation unit 103, a central processing unit (CPU) 105, a random access memory (RAM) 106, a storage device 107, a print engine 108, and a scanner engine 114, all of which are connected to an internal bus. The NW communication unit 102 performs NW communication with an external device (e.g., PC 125) via the network 126. The UI operation unit 103 is a user interface that includes a touch panel type display screen for receiving settings with respect to the MFP 101. Further, the UI operation unit 103 can display the state of the MFP 101, receive touch operations from an operator, etc. The CPU 105 executes image processing on print data and various types of control. The RAM 106 is a work memory for developing a computer program executed by the CPU 105 and temporarily storing data being processed, etc. The storage device 107 stores the computer program, processed data, and other data. The print engine 108 prints image data on a sheet medium. The printing is executed using a known technique such as an electrophotography technique, etc. The scanner engine 114 optically reads images printed on sheet mediums.

The MFP 101 includes a copy function in default configuration. The copy function is realized as follows. Specifically, the CPU 105 reads image data from the scanner engine 114 according to the computer program in response to an operation performed on the UI operation unit 103. The read image data is input into the storage device 107, undergoes necessary image processing, and is output from the print engine 108.

The following describes the PC 125. The PC 125 includes a NW communication unit 118, a CPU 119, a RAM 120, a storage device 122, and an input unit 123, all of which are connected to an internal bus. The NW communication unit 118 communicates with the MFP 101 via the network 126. The CPU 119 executes various types of control. The RAM 120 is a work memory for temporarily storing information such as a computer program executed by the CPU 119, etc. The storage device 122 stores the computer program and data. The input unit 123 receives information which an operator inputs to the PC 125.

Figure 2:
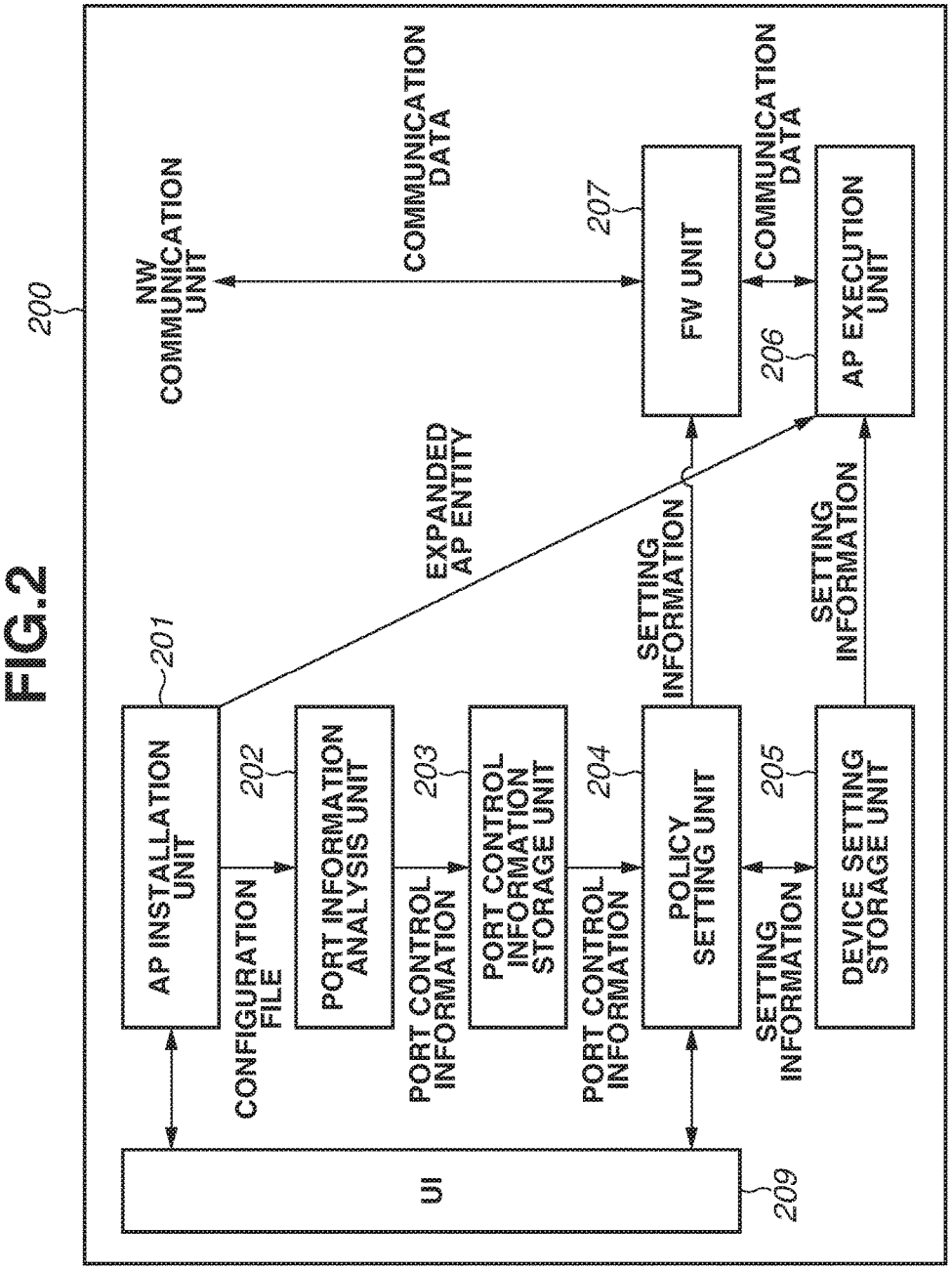
FIG. 2 is a schematic configuration diagram illustrating a security policy control function.

FIG. 2 is a schematic configuration diagram illustrating a security policy control function formed in the MFP 101 as a result of execution of a computer program stored in the storage device 107 by the CPU 105 of the MFP 101. A control function 200 performs control on the use of a port that reflects a security policy when an application that uses the network is executed. As described above, the port is an input/output port via which communication data is input to or output from an external apparatus. In the present specification, an application (application program) will be referred to as "AP." As the control function 200, an AP installation unit 201 (installation unit) performs installation of an AP. The AP installation unit 201 starts operating once the MFP 101 is activated. Thereafter, the AP installation unit 201 continues operating until the MFP 101 is shut down. In the first exemplary embodiment, an example will be described in which an AP is installed in advance or installed post hoc in the MFP 101. The AP that is installed post hoc is particularly referred to as an expanded AP. The configuration of the expanded AP is slightly different from that described above as the conventional technologies. The configuration of the expanded AP according to the first exemplary embodiment and a procedure to be performed by the AP installation unit 201 will be described below.

A port information analysis unit 202 (analysis unit) generates port control information indicating a security policy relating to a port that is to be used by the installed expanded AP or the use of which by the installed expanded AP is to be restricted. Specifically, the port information analysis unit 202 analyzes description information contained in an expanded AP configuration file, which will be described below, to generate port control information. The port information analysis unit 202 is called when the expanded AP is installed by the AP installation unit 201. A procedure to be performed by the port information analysis unit 202 and specific contents of the port control information will be described below.

A port control information storage unit 203 (storage unit) stores a policy setting screen for setting a security policy when using the port and also stores the port control information generated by the port information analysis unit 202. A basic portion and an expanded portion of the port control information are stored separately. The basic portion is a portion that is set as a security policy of the MFP 101 prior to the installation of the expanded AP. The expanded portion is a portion that is added (expanded) as a result of the installation of the expanded AP. The basic portion and the expanded portion of the port control information will be described below.

A policy setting unit 204 calls policy setting items and edits the policy setting items using the port control information. Then, the policy setting unit 204 displays the edited policy setting items on a display screen of a UI 209. Further, the policy setting unit 204 (setting unit) receives setting input with respect to the displayed policy setting items and generates setting information for execution of port opening/closing control (control to open or close the port) according to the received setting input. A procedure to be performed by the policy setting unit 201 will be described below.

A device setting storage unit 205 stores the setting information set by the policy setting unit 204 and transmits the setting information to the AP execution unit 206 as needed. The setting information is updated each time an expanded AP is installed.

An AP execution unit 206 is embedded to execute the existing AP and the expanded AP in the MFP 101. What to be executed by the AP execution unit 206 changes each time an expanded AP is installed by the AP installation unit 201. A firewall (FW) unit 207 is a firewall unit configured to perform the port opening/closing control according to the setting information. Specifically, when the AP execution unit 206 performs network communication, the FW unit 207 performs control to permit or prohibit the passing of internal and external communication data based on a port filtering rule. The UI 209 provides the display screen of the UI operation unit 203 as a UI screen that is a display screen for input of operations. Further, the UI 209 recognizes touch operations, etc. performed on the display screen by an operator. Specifically, the UI 209 functions as an information display unit and an information input unit.

<Expanded AP>

Figure 3:
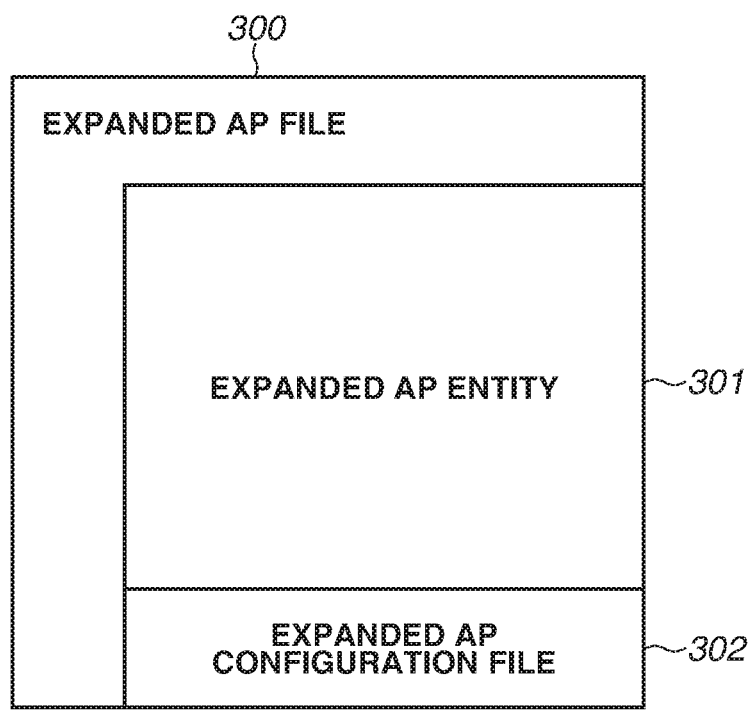
FIG. 3 illustrates a configuration of an expanded application (AP).

The following describes in detail the expanded AP installed in the MFP 101. The expanded AP is installed to add (expand) a function post hoc in addition to basic functions preinstalled in the MFP 201 such as a copy function, a print function, a scan function, etc. The installed expanded AP operates similarly to an AP preinstalled in the MFP 101. The configuration of an expanded AP is, for example, as illustrated in FIG. 3. Specifically, the expanded AP exists as an expanded AP file 300. In FIG. 3, the expanded AP file 300 includes an expanded AP entity 301 and an expanded AP configuration file 302. The expanded AP entity 301 is generated by a programming language and realizes a function. The expanded AP configuration file 302 is a file describing the quality, feature, property, and specification of the expanded AP. Specifically, description information specifying a security policy, a protocol, and a port to be used is stored as a readable text file. FIG. 4 illustrates an example of the expanded AP configuration file 302 according to the present exemplary embodiment.

Details of respective text lines in the expanded AP configuration file 302 illustrated in FIG. 4 are as follows. "Application Name:ApplicationX" indicates that the name of the expanded AP is "ApplicationX". "Application Version:1.0.0" indicates that the version of the expanded AP is "1.0.0". "Application ID:2234-5678-90ab-cdef" indicates that the identifier of the expanded AP is "1234-5678-90ab-cdef". The identifier is used to identify the expanded AP from a plurality of expanded APs. "Manufacture:VenderA" indicates that the person or company that manufactured the expanded AP is "VenderA". "Port ID:21000/TCP" and "Port Description: ApplicationX Print Server Port" are used in sets. This description is a line declaring that the expanded AP uses the relevant port. The first "Port ID:" indicates the specification (No. 21000 in Transmission Control Protocol (TCP)), which is an example of the identification information about the port to be used. Further, "Port Description:" indicates that the description of the port is "ApplicationX Print Server Port". "Port ID: 21001/UDP" and "Port Description: ApplicationX Administration Port" indicate that a single expanded AP can use a plurality of ports. In other words, in the present exemplary embodiment, definition of a plurality of ports is permitted. In the example described above, "Port ID" describes the specification (No. 21001 in User Datagram Protocol (UDP)) of a different port. Further, "Port Description:" indicates that the description of the port is "ApplicationX Administration Port". As described above, the foregoing description information is used to generate the policy control information.

The expanded AP configuration file 302 containing the description of the manufacturer of the expanded AP according to a predetermined format is provided at the time of the distribution of the expanded AP. There are cases where the expanded AP is stored in predetermined archive format. Further, there are cases where data compression or encryption is performed using a predetermined method.

Figure 5:
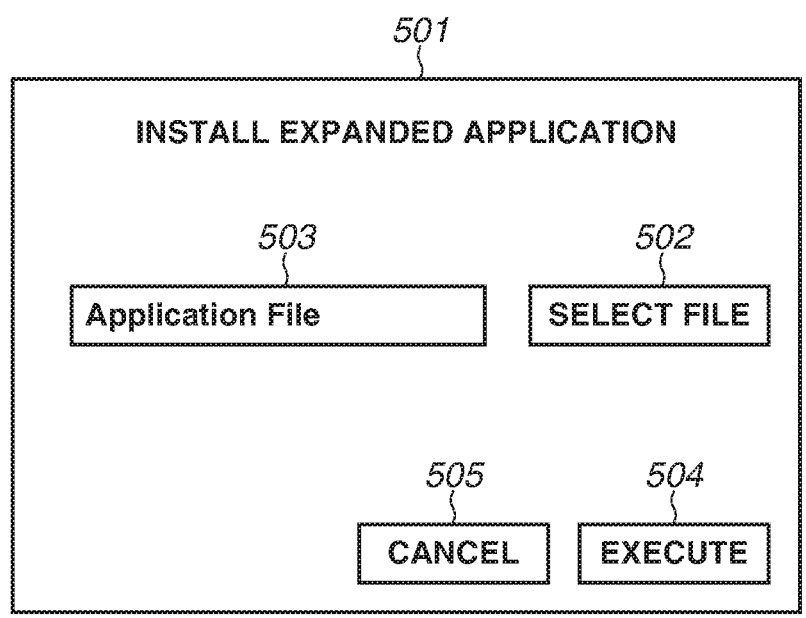
FIG. 5 illustrates an example of a user interface (UI) screen for editing.

An expanded AP installation process is performed through operations on the UI screen displayed on the UI 209. FIG. 5 illustrates an example of the UI screen. The UI screen is displayed on the UI 209 by the AP installation unit 201. In FIG. 5, a file selection button 502 for selecting an expanded AP (expanded AP file 300) to be installed into the MFP 101 and a text box 503 for displaying the selected expanded AP file 300 are displayed on the UI screen 501. Further, an execution button 504 for giving an instruction to execute installation of the expanded AP file 300 and a cancellation button 505 for cancelling the execution of installation are also displayed on the UI screen 501. The expanded AP file 300 to be displayed as a candidate when the operator presses the file selection button 502 is stored in advance in the storage device 107. Further, the expanded AP file 300 to be displayed as a candidate may be a file read from an external storage device such as a universal serial bus (USE) storage, etc. connected to the MFP 101 via a USE interface (not illustrated). Further, the expanded AP file 300 to be displayed as a candidate may be a file read from a file server connected on the network. Further, in a case of a web interface method in which the UI 209 is browsed with a browser by the PC 125 via the network, the PC 125 may transmit a file locally stored in the PC 125.

<Installation of AP>

Figure 6:
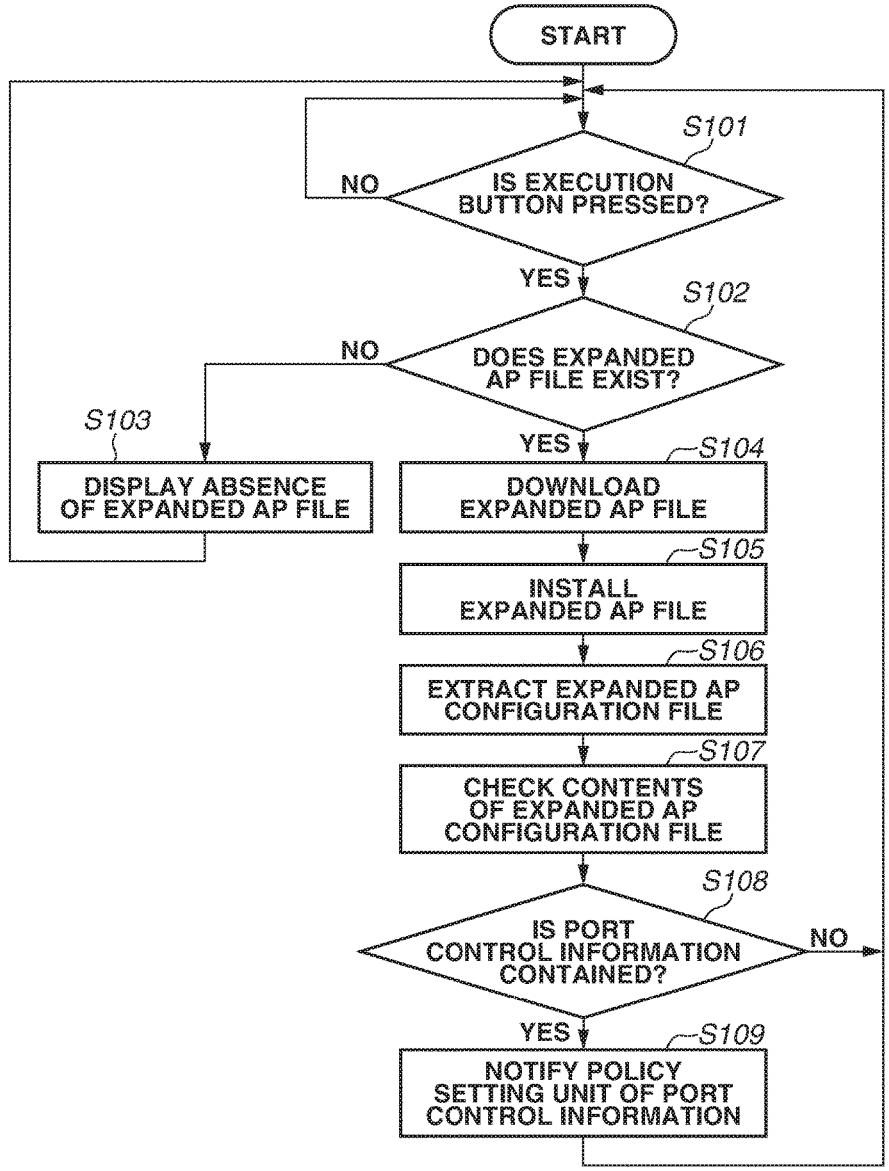
FIG. 6 is a flow chart illustrating a procedure to be executed at the time of installation of an expanded AP.

FIG. 6 is a flow chart illustrating a process to be performed by the AP installation unit 201 at the time of installation of the expanded AP. First, in step S101, the AP installation unit 201 determines whether the execution button 504 illustrated in FIG. 5 is pressed. If the execution button 504 is not pressed (NO in step S101), the processing returns to step S101. On the other hand, if the execution button 504 is pressed (YES in step S101), then in step S102, the AP installation unit 201 checks whether the expanded AP file 300 exists in a path described in the text box. If the expanded AP file 300 does not exist (NO in step S102), then in step S103, the AP installation unit 201 displays the absence of the expanded AP file 300 on the UI 209, and the processing returns to step S101. On the other hand, if the expanded AP file 300 exists (YES in step S102), then in step S104, the AP installation unit 201 downloads the expanded AP file 300 from the path. Then, in step S105, in order to make the downloaded expanded AP file 300 operable, the AP installation unit 201 extracts the expanded AP entity 301 and installs the expanded AP file 300. Then, in step S106, the AP installation unit 201 extracts the expanded AP configuration file 302 from the expanded AP file 300. Then, in step S107, the AP installation unit 201 checks contents of the expanded AP configuration file 302. In step S108, the AP installation unit 201 determines whether port control information is contained in the expanded AP configuration file 302. If port control information is contained (YES in step S108), then in step S109, the AP installation unit 201 notifies the policy setting unit 204 of the port control information.

<Port Information Analysis>

Figure 7:
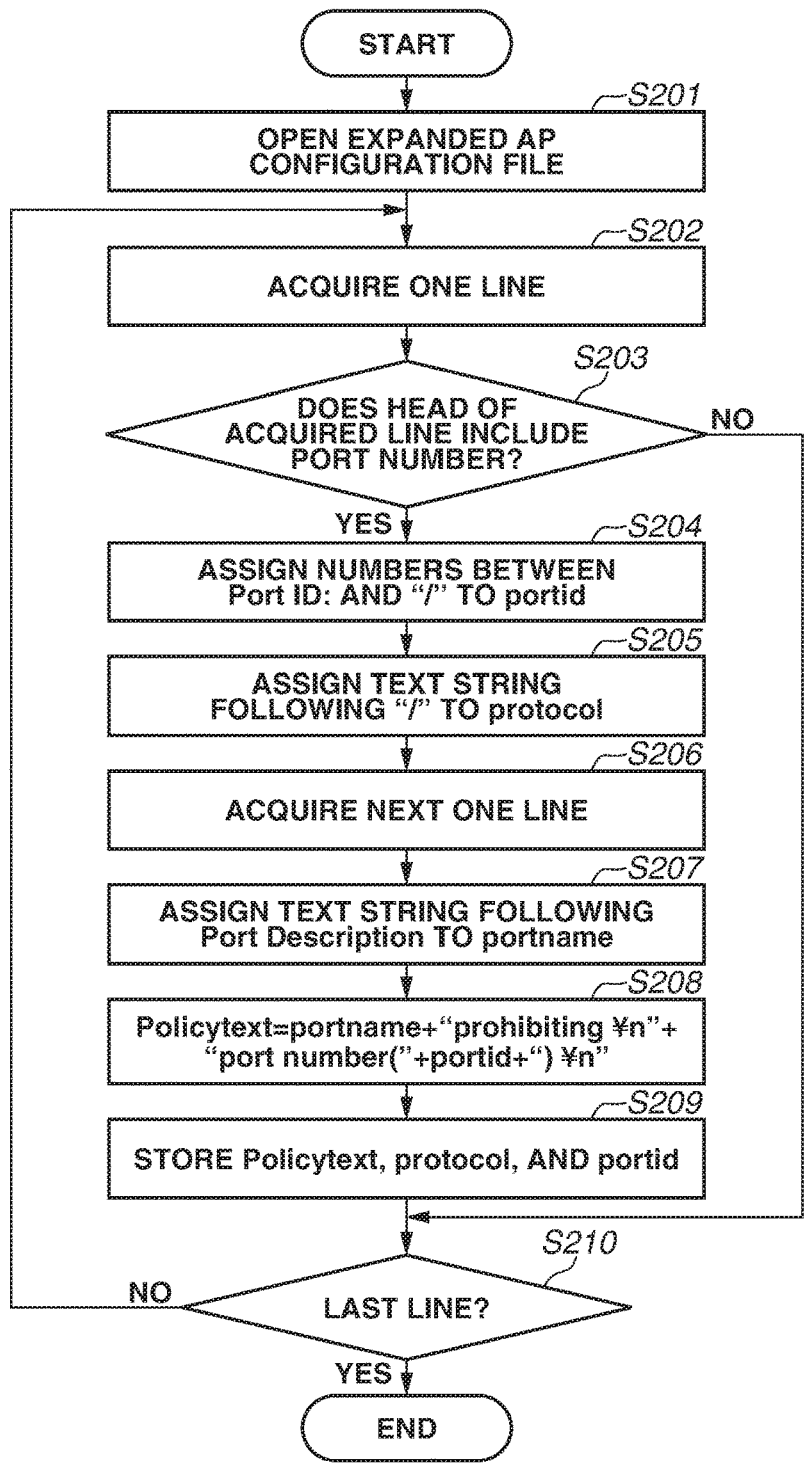
FIG. 7 is a flow chart illustrating a port information analysis process.

The following describes details of a process to be executed by the port information analysis unit 202. FIG. 7 is a flow chart illustrating the process to be executed by the port information analysis unit 202. In FIG. 7, first, in step S201, the port information analysis unit 202 opens the expanded AP configuration file 302 included in the expanded AP file 300 described above. Then, in step S202, the port information analysis unit 202 acquires one line from the expanded AP configuration file 302. Then, in step S203, the port information analysis unit 202 checks whether the head of the acquired line includes a port number, i.e., "Port ID:". If no port number is included (NO in step S203), the processing proceeds to step S210, and the port information analysis unit 202 determines whether the line is the last line. If the line is the last line (YES in step S210), the processing is ended. On the other hand, if the line is not the last line (NO in step S210), the processing returns to step S202. For example, in a case where the fifth line in FIG. 4 is checked, the port information analysis unit 202 determines that "Port ID:" is included (YES in step S203). In this case, in step S204, the port information analysis unit 202 extracts numbers between "Port ID:" and "/", which is "21000" in this example, and assigns the extracted numbers to "portid", which is a buffer port number management item formed in the RAM 106. In step S205, "TCP", which is a text string following "/", is assigned to "protocol", which is a protocol management item. Then, in step S206, the port information analysis unit 202 acquires the next one line. Then, in step S207, the port information analysis unit 202 assigns a text string following "Port Description:", which is "ApplicationX Print Server Port" in this example, to "portname", which is a port description management item. Then, in step S208, the port information analysis unit 202 configures text (Policytext) for policy based on the information about the respective buffer management items. In this example, the text string "prohibit ApplicationX Print Server Port \n port number 21000\n" is configured as "Policytext". Then, in step S209, the port information analysis unit 202 collectively stores the information about "Policytext", "protocol", and "portid" as the port control information in the port control information storage unit 203, and the processing proceeds to step S210 described above.

<Setting/Applying of Security Policy>

The following describes the setting and applying of a security policy in the MFP 101 at the time of installation of the expanded AP. The setting of the security policy is performed by the policy setting unit 204. As described above, first, the policy setting unit 204 edits the policy setting items based on the port control information stored in the port control information storage unit 203. Specifically, the policy setting unit 204 combines the basic portion and the expanded portion together to edit the policy setting items, and displays the edited policy setting items on the display screen of the UI 209. Further, the policy setting unit 204 receives setting input with respect to the displayed edited policy setting items via the UI 209 and generates the setting information.

The following describes in detail the basic portion and the expanded portion of the port control information. FIG. 8 illustrates the display screen of the UI 209 before the installation of the expanded AP. In FIG. 8, the basic portion of the policy control information is displayed as the policy setting items. The basic portion is described in a language that enables layout description, for example, in Hypertext Markup Language (HTML). Each square portion is a checkbox. The operator is prompted to check a checkbox, whereby setting input is received. On the other hand, FIG. 9 illustrates the expanded portion of the policy control information stored in the port control information storage unit 203 as a result of the installation of the expanded AP and the analysis of the expanded AP configuration file 302 as described above. As illustrated in FIG. 9, the expanded portion of the port control information includes "Policytext, Protocol, Port ID". The policy setting unit 204 combines the expanded portion with the basic portion to edit the policy setting items. A checkbox is also provided to each item in the expanded portion. The checkboxes can be added with ease by HTML description. FIG. 10 illustrates a display screen displaying the edited policy setting items. In FIG. 10, a portion 1001 specified by a broken line is the portion added as the expanded portion. On the display screen, a button image with the description "Update" is also displayed. For convenience, the button image will be referred to as an updating button. When the updating button 1002 pressed, the policy setting unit 204 recognizes that reception of setting input to the policy setting items by the operator is completed.

FIG. 11 illustrates an example of an entire process to be performed by the policy setting unit 204. The policy setting unit 204 is called when a security policy setting function (illustration thereof is omitted) is selected from the UI 209. First, in step S301, the policy setting unit 204 acquires a port setting item and port control information from the port control information storage unit 203. In step S302, the policy setting unit 204 determines whether an expanded portion exists in the port setting item and the port control information. When an expanded portion does not exist, it indicates that no expanded AP is installed. In this case (NO in step S302), in step S303, the policy setting unit 204 displays the basic portion of the port control information on the display screen of the UI 209 (refer to FIG. 8). On the other hand, in step S302, if an expanded portion exists (YES in step S302), then in step S304, the policy setting unit 204 acquires the expanded portion of the port control information. Then, in step S305, the policy setting unit 204 displays on the display screen of the UI 209 the policy setting items of the basic portion and the expanded portion that include the information described in "Policytext" and the added checkboxes. The policy setting items with the checkboxes are displayed so that the operator can input the setting by entering a check into a checkbox of a desired policy setting item.

On the display screen of the UI 209, a list of all ports that can be used is displayed, and only the setting input for a port that is to be used is received. Specifically, a port that cannot be recognized (port that is not displayed) is not opened so that the complete and comprehensive settings can be made. In this way, the use states of all ports in the MFP 101 can be recognized. Further, it also becomes possible to perform an operation to prohibit (close) the use of a port other than the ports the use of which is permitted.

In step S306, the policy setting unit 204 checks whether the updating button 1002 is pressed. If the updating button 1002 is not pressed (NO in step S306), the policy setting unit 204 waits until the updating button 1002 is pressed. On the other hand, if the updating button 1002 is pressed (YES in step S306), the contents of the setting input with respect to the policy setting items checked by the operator are decided, and the policy setting unit 204 generates the generation information. Then, the policy setting unit 204 instructs the FW unit 207 to forcibly apply the filtering rule (also referred to as "security rule") reflecting the generation information. The forcibly applied filtering rule will be referred to as "forced rule." An example of the forced rule is illustrated in FIG. 12. The forced rule is statically held in the RAM 106 during the execution of the processing of the policy setting unit 204. In FIG. 12, the section "Security policy item" corresponds to checked policy setting items among the policy setting items illustrated in FIG. 10. The section "Forced setting item" shows a description (text sentence) of the forced rule displayed on the display screen of the UI 209. The section "Setting value" shows a value indicating whether to close (OFF) or open (ON) the port. The term "setting information" refers to these contents of the entire lines.

First, the policy setting unit 204 applies the forced rule to the basic portion based on the setting information. Specifically, in step S307, the policy setting unit 204 closes (OFF) all ports corresponding to checked policy setting items of the basic portion. Further, in step S308, in order to prevent a post hoc setting against the security policy, the policy setting unit 204 prohibits a change to the settings of the closed ports. Then, in step S309, the policy setting unit 204 instructs the FW unit 207 to close all ports. Next, in step S310, the policy setting unit 204 acquires the port control information about checked policy setting items of the expanded portion. Then, in step S311, the policy setting unit 204 determines "Port ID", which is a port number, of all the checked policy setting items. Thereafter, in step S312, the policy setting unit 204 instructs the FW unit 207 to permit the use of the determined Port ID. In this way, the operation to prohibit the use of a port other than the permitted ports becomes possible.

<Execution of Expanded AP>

The AP execution unit 206 receives the setting information from the device setting storage unit 205 and also receives the expanded. AP entity 301 from the AP installation unit 201 to enable execution of the expanded AP. The FW unit 207 receives communication data when the AP execution unit 206 performs, for example, NW communication. The FW unit 207 performs control to permit or prohibit the passing of the communication data based on the port filtering rule received in advance from the policy setting unit 204. Only the permitted communication data is sent out to the network 126 via the NW communication unit 102.

Thus, in the first exemplary embodiment, when an expanded AP is installed, port control information is extracted from a description of a unique expanded AP configuration file 302 held by the expanded AP. Then, the policy setting unit 204 edits policy setting items based on the port control information. Specifically, an expanded portion is added to a basic portion. In the MFP 101, setting input with respect to the edited policy setting items is received to generate the setting information, and only permitted ports are opened while ports that are not permitted are all closed. Thus, even in the case where the expanded AP is installed, the use states of the ports can reliably be recognized while the convenience at the time of the setting of the security policy is maintained.

Further, in the first exemplary embodiment, the setting information generated by the installation of the expanded AP is reflected to the FW unit 207. The firewall function provided by the FW unit 207 can restrict the operation of a protocol in the Internet Protocol (IP) layer. Thus, use of all ports other than the permitted ports can reliably be prohibited.

Figure 13:
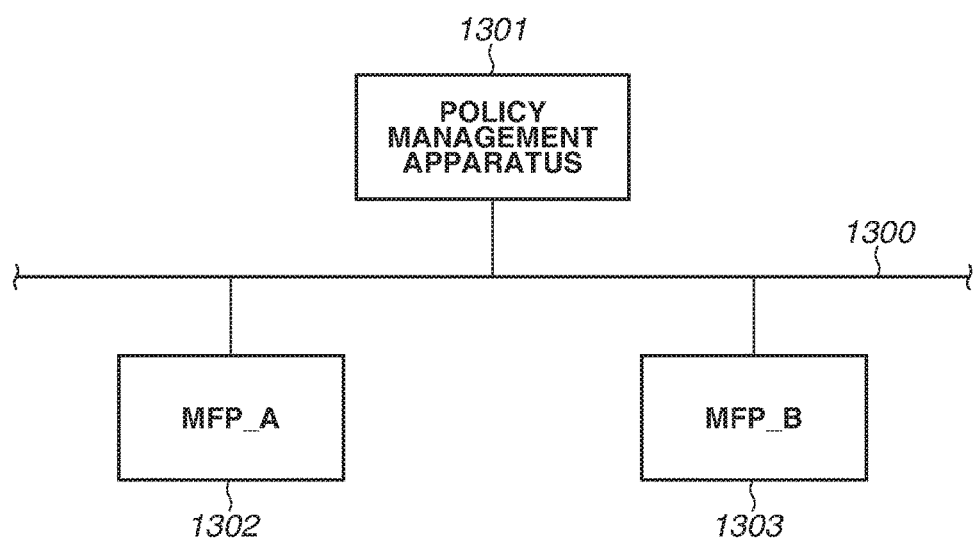
FIG. 13 is a configuration diagram illustrating an information processing system according to a second exemplary embodiment.

In the first exemplary embodiment, the example has been described in which a security policy is set and applied to a single MFP 101. As described above, various devices can be connected to the network 126, which is a communication path. It is obviously possible to connect a plurality of MFPs to the network 126. In this case, it is desirable to centrally manage the security policy settings of the plurality of MFPs. In a second exemplary embodiment, a security policy management method will be described in which the security policy settings of a plurality of MFPs are centrally managed. FIG. 13 is a configuration diagram illustrating an information processing system for the implementation of the security policy management method. FIG. 13 illustrates an example in which a policy management apparatus 1301 and a MFP_A 1302 and a MFP_B 1303, both of which are management targets, are connected to a network 1300. While two MFPs are described in the present exemplary embodiment to simplify the description, one MFP alone or two or more MFPs can be managed similarly.

The security policy management method according to the present exemplary embodiment includes roughly the following processing steps.

(1) Step 1
The policy management apparatus 1301 configured to edit the policy setting items is connected to the MFP_A 1302 and the MFP_B 1303 via a communication path.

(2) Step 2
The MFP_A 1302 and the MFP_B 1303 each generate port control information indicating a security policy relating to a port that is to be used by an expanded AP or the use of which by the expanded AP is to be restricted when the expanded AP is installed into the MFP_A 1302 and the MFP_B 1303. Then, the MFP_A 1302 and the MFP_B 1303 transmits the generated port control information to the policy management apparatus 1301.

(3) Step 3
The policy management apparatus 1301 edits policy setting items reflecting the port control information received from the MFP_A 1302 and the MFP_B 1303. Further, the policy management apparatus 1301 receives setting input with respect to the edited policy setting items. In this way, the policy management apparatus 1301 generates setting information and distributes the generated setting information to the MFP_A 1302 and the MFP_B 1303 from which the port control information is received.

Figure 14:
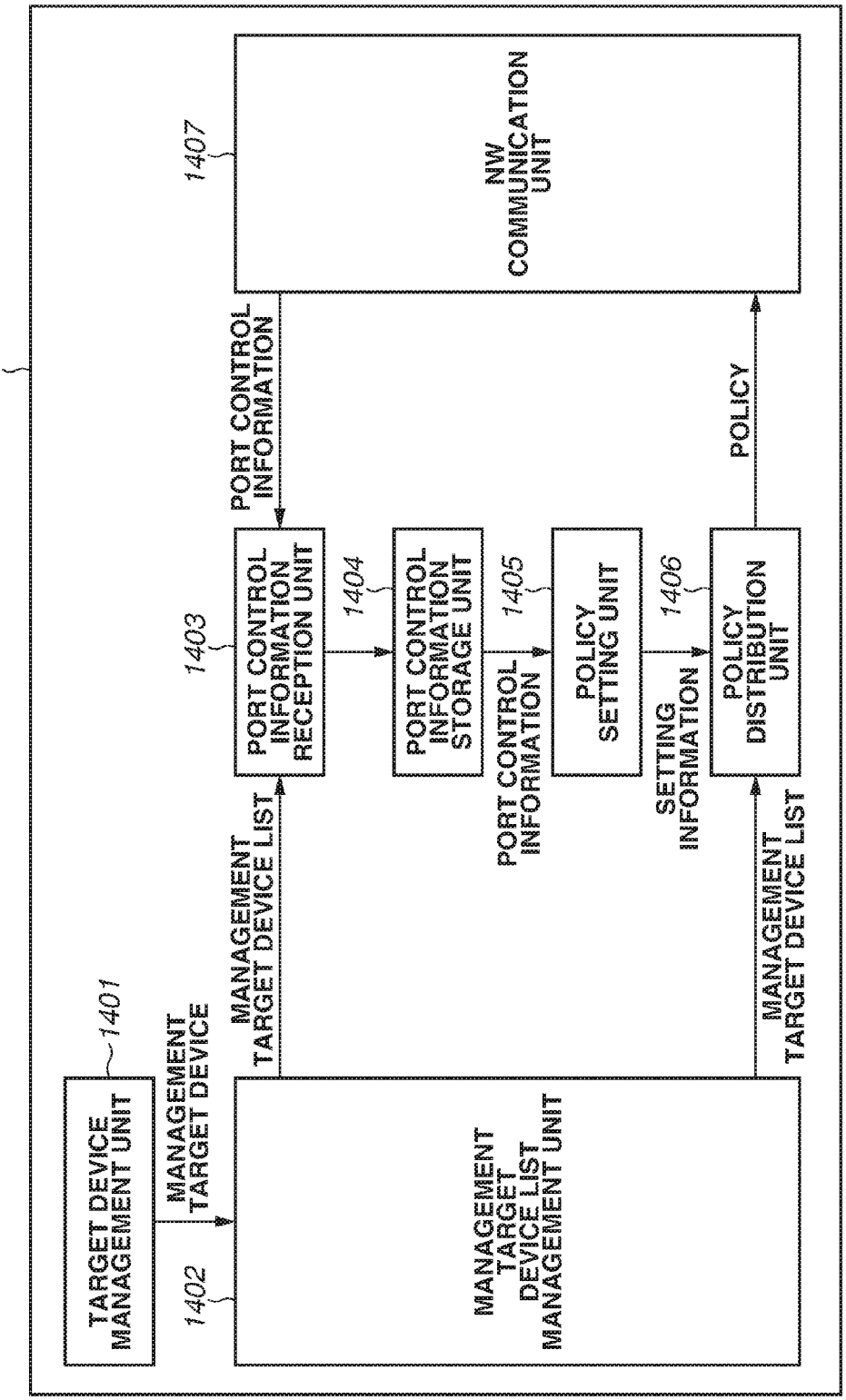
FIG. 14 is a configuration diagram illustrating a control function included in a policy management apparatus.

The following describes the configuration of the apparatus that executes the foregoing management method. The policy management apparatus 1301 is a computer having a communication function and a control function of generating and distributing security policy settings. The policy management apparatus 1301 includes a CPU, a RAM, and a storage device storing a computer program, like the MFP described above in the first exemplary embodiment. FIG. 14 illustrates an example of a configuration or a control function formed in the policy management apparatus 1301 as a result of the reading and execution of the computer program by the CPU. In FIG. 14, a control function 1400 of the policy management apparatus 1301 includes a target device management unit 1401, a management target device list management unit 1402, a port control information reception unit 1403, and a port control information storage unit 1404. The control function 1400 further includes a policy setting unit 1405, a policy distribution unit 1406, and a NW communication unit 1407.

The target device management unit 1401 (registration unit) performs registration of MFPs to be managed based on an instruction from the operator. Further, the target device management unit 1401 performs addition, change, deletion, etc. on the registered items. The management target device list management unit 1402 stores a list of registered MFPs. The port control information reception unit 1403 (reception unit) receives port control information from one registered MFP or a plurality of registered MFPs via the network 1300. The port control information storage unit 1404 stores the port control information received from the respective MFPs. The policy setting unit 1405 presents the policy setting items to the operator via a UI similar to the UI 209 used in the first exemplary embodiment, and allows reception of setting input. The setting items at this time are the edited setting items reflecting all pieces of received port control information. Then, based on the received setting input, the policy setting unit 1405 (setting unit) generates control information for performing the port opening/closing control in each of the MFPs. The policy distribution unit 1406 (distribution unit) distributes the generated setting information to all MFPs having received the policy control information. The NW communication unit 1407 (communication unit) is the unit that communicates with the network 1300, and realizes a function corresponding to the NW communication unit 102 according to the first exemplary embodiment by means of software. It is naturally possible to use the NW communication unit 102 similar to that in the first exemplary embodiment.

Figure 15:
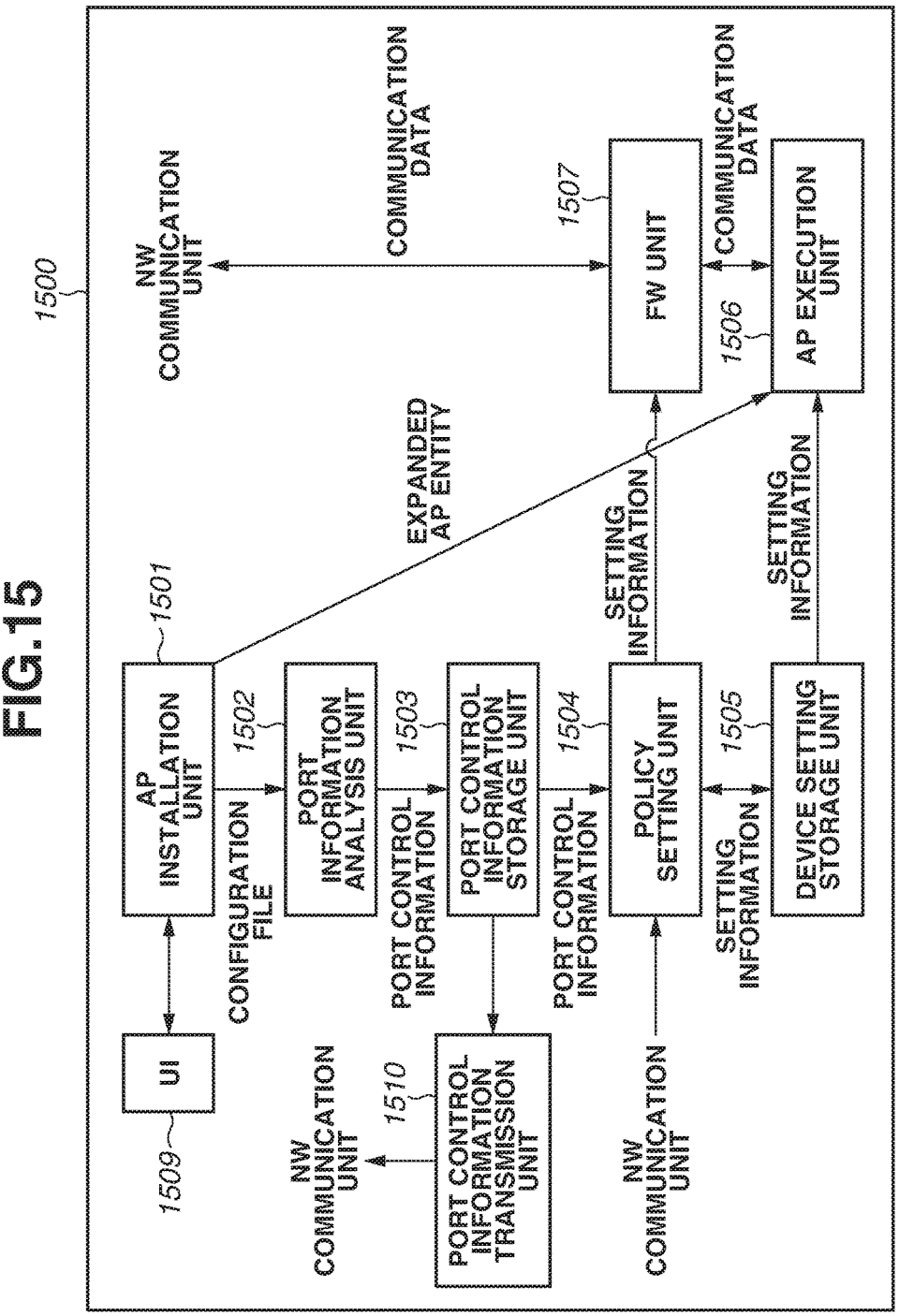
FIG. 15 is a function configuration diagram illustrating a multifunction peripheral (MFP) according to the second exemplary embodiment.

FIG. 15 is a functional configuration diagram illustrating the MFP_A 1302 and the MFP_B 1303. The illustrated functional configuration is substantially the same as that of the MFP 101 described above in the first exemplary embodiment. FIG. 15 corresponds to FIG. 2 as follows. A control function 1500 corresponds to the control function 200. An AP installation unit 1501 corresponds to the AP installation unit 201. A port information analysis unit 1502 corresponds to the port information analysis unit 202. A port control information storage unit 1503 corresponds to the port control information storage unit 203. A policy setting unit 1504 corresponds to the policy setting unit 204 but is different from the policy setting unit 204 in that no UI is included and the NW communication unit is connected instead. A device setting storage unit 1505 corresponds to the device setting storage unit 205. An AP execution unit 1506 corresponds to the AP execution unit 206. A FW unit 1507 corresponds to the FW unit 207. A UI 1509 corresponds to the UI 209. A NW communication unit performs operations similar to those performed by the NW communication unit 102 illustrated in FIG. 1.

The MFP_A 1302 and the MFP_B 1303 according to the second exemplary embodiment each include a port control information transmission unit 1510. The port control information transmission unit 1510 transmits the port control information stored in the port control information storage unit 1503 to the policy management apparatus 1301 via the NW communication unit (102). Further, the policy setting unit 1504 receives information about the setting input to the policy management apparatus 1301 and generates setting information based on the received information. Then, the policy setting unit 1504 transmits the setting information to the device setting storage unit 1505 and the FW unit 1507.

The following describes as an example an operation performed in a case where different expanded. APs are respectively installed into the MFP_A 1302 and the MFP_B 1303. The expanded AP "ApplicationX" is installed into the MFP_A 1302 as in the first exemplary embodiment. On the other hand, the different expanded AP "ApplicationY" is installed into the MFP_B 1303. The port control information of "ApplicationX" is similar to that illustrated in FIG. 9. On the other hand, the port control information of "ApplicationY" is illustrated in FIG. 16. Accordingly, an expanded AP configuration file is formed as illustrated in FIG. 17.

The port control information of the MFP_A 1302 and the port control information of the MFP_B are transmitted to the port control information reception unit 1403 of the policy management apparatus 1301 by the port control information transmission unit 1510. Then, the port control information of the MFP_A 1302 and the port control information of the MFP_B 1303 are combined together and stored in the port control information storage unit 1404. The operation of the policy setting unit 1405 is similar to that of the policy setting unit 204 in the first exemplary embodiment.

FIG. 10 illustrates an example of a UI screen for setting a security policy that is edited following the installation of expanded APs into the MFP_A 1302 and the MFP_B 1303 and displayed on the policy setting unit 1405. In FIG. 18, added policy setting items 1801 are a portion added by a port used by the expanded. AP "ApplicationX" uniquely held by the MFP_A 1302. A policy setting item 1802 is a portion added by a port used by the expanded AP "ApplicationY" uniquely held by the MFP_B 1303. Specifically, the two policy setting items 1801 and 1802 are combined as an expanded portion to the basic portion.

Suppose that setting is received from the operator with respect to the edited policy setting items illustrated in FIG. 18 and the updating button 1803 is pressed. Then, the policy management apparatus 1301 generates setting information for performing the port opening/closing control in the MFP_A 1302 and the MFP_B 1303. Then, the policy management apparatus 1301 distributes the security policy setting information to the MFP_A 1302 and the MFP_B 1303 via the policy distribution unit 1406. The policy setting unit 1504 of each of the MFP_A 1302 and the MFP_B 1303 applies a forced rule to the device setting storage unit 1505 and the FW unit 1507 according to the received setting information. Specifically, the policy setting unit 1504 changes the filtering rule setting information of the FW unit 1507. In this way, the security policies for the case where the expanded APs are installed can be managed centrally.

Thus, in the second exemplary embodiment (management method), setting information can be managed centrally at the policy management apparatus 1301 even in the case where expanded APs are respectively installed into a plurality of MFPs (1302, 1303). Further, addition of a certain restriction to the use of a port in each MFP (1302, 1303) is facilitated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-005582, filed Jan. 15, 2015, which is hereby incorporated by reference herein in its entirety.

What is claimed is:

1. An information processing system comprising:
at least one processor devices:
a storage unit configured to store a policy setting item for setting a security policy for one or more ports when the ports are used via which communication data is input to or output from an external apparatus;
an installation unit configured to install an application, wherein the application contains an application configuration file that includes at least descriptive information to enable an information processing apparatus to generate application specific port control information;
an obtaining unit of a policy management entity configured to obtain, in accordance with an installation of the application, the application specific port control information corresponding to a security policy relating to a specific port based on the application configuration file, wherein the specific port is specific to the application; and
a setting unit of the policy management entity configured to set and edit setting information, after the installation of the application to the information processing apparatus, a configuration of a first port setting in accordance with the application specific port control information obtained by the obtaining unit to an existing configuration of a second port setting relating to a port which has been used by other functions and is to be used by the application at least in the information processing apparatus, wherein the policy management entity registers the information processing apparatus to which the setting information is to be distributed, and
a display unit configured to
display, before the installation of the application, the existing configuration of the second port setting relating to a port which has been used by the other functions in the information processing apparatus, but not display the configuration of the first port setting in accordance with the application specific port control information obtained by the obtaining unit, and
display, after the installation of the application to the information processing apparatus, both the configuration of the first port setting in accordance with the application specific port control information obtained by the obtaining unit and the existing configuration of the second port setting relating to a port which has been used by the other functions of the information processing apparatus, wherein the configurations of the first port setting and the second port setting which are displayed on the display unit can be configured and edited by a user and the setting unit of the policy management entity can be subsequently notified with the configured and edited application specific port control information to generate the setting information for performing control to open/close a port in the information processing apparatus and further distribute the generated setting information to the registered information processing apparatus.

2. The information processing apparatus according to claim 1,
wherein the application contains an application configuration file storing descriptive information specifying the security policy, a protocol, and the specific port to be used, and
wherein the obtaining unit obtains the application specific port control information based on the descriptive information of the application configuration file.

3. The information processing apparatus according to claim 1, wherein the setting unit displays the policy setting item on a predetermined display screen, receives setting input with respect to the displayed policy setting item, and generates setting information according to the received setting input.

4. The information processing apparatus according to claim 3, wherein the setting unit displays a list of all usable ports on the display screen and receives the setting input only for the port or ports to be used.

5. The information processing apparatus according to claim 1, further comprising a firewall unit configured to perform control to open/close the specific port according to the setting by the setting unit.

6. The information processing apparatus according to claim 1, further comprising a notification unit configured to notify the application specific port control information to the setting unit, the setting unit existing in the information processing apparatus or existing outside the information processing apparatus and connected to the information processing apparatus via a communication link.

7. The information processing apparatus according to claim 1, wherein the specific port is to be used by the installed application or has restrictions on its use by the installed application.

8. The information processing apparatus according to claim 1,
wherein the setting unit is configured to include in the policy setting item at least the first port setting in accordance with the application specific port control information obtained by the obtaining unit and the second port setting relating to a port which is commonly used at least in the information processing apparatus.

9. The information processing apparatus according to claim 8, wherein the setting unit displays the policy setting item on a predetermined display screen, receives setting input with respect to the displayed policy setting item, and generates setting information according to the received setting input.

10. A method for controlling an information processing system, the method comprising:
storing a policy setting item for setting a security policy for one or more ports when the ports are used via which communication data is input to or output from an external apparatus;

installing an application, wherein the application contains an application configuration file that includes at least descriptive information to enable an information processing apparatus to generate application specific port control information;

obtaining by a policy management entity, in accordance with an installation of the application, the application specific port control information corresponding to a security policy relating to a specific port based on the application configuration file, wherein the specific port is specific to the application; and set and edit setting information, at a setting unit of the policy management entity, after the installation of the application to the information processing apparatus, a configuration of a first port setting in accordance with the application specific port control information obtained by the obtaining to an existing configuration of a second port setting relating to a port which has been used by other functions and is to be used by the application at least in the information processing apparatus, wherein the policy management entity registers the information processing apparatus to which the setting information is to be distributed, and displaying, at a display unit, before the installation of the application, the existing configuration of the second port setting relating to a port which has been used by the other functions in the information processing apparatus, and not displaying the configuration of the first port setting in accordance with the application specific port control information obtained by the obtaining unit, and displaying, at the display unit, after the installation of the application to the information processing apparatus, both the configuration of the first port setting in accordance with the application specific port control information obtained by the obtaining unit and the existing configuration of the second port setting relating to a port which has been used by the other functions of the information processing apparatus, wherein the configurations of the first port setting and the second port setting which are displayed on the display unit can be configured and edited by a user and the setting unit of the policy management entity can be subsequently notified with the configured and edited application specific port control information to generate the setting information for performing control to open/close a port in the information processing apparatus and further distribute the generated setting information to the registered information processing apparatus.

11. The method according to claim 10,
wherein the application contains an application configuration file storing descriptive information specifying the security policy, a protocol, and the specific port to be used, and
wherein the obtaining obtains the application specific port control information based on the descriptive information of the application configuration file.

12. The method according to claim 10, wherein the setting unit displays the policy setting item on a predetermined display screen, receives setting input with respect to the displayed policy setting item, and generates setting information according to the received setting input.

13. The method according to claim 12, wherein the setting unit displays a list of all usable ports on the display screen and receives the setting input only for the port or ports to be used.

14. The method according to claim 10, further comprising a firewall unit configured to perform control to open/close the specific port according to the setting by the setting unit.

15. The method according to claim 10, further comprising notifying the application specific port control information to the setting unit, the setting unit existing in the information processing apparatus or existing outside the information processing apparatus and connected to the information processing apparatus via a communication link.

16. The method according to claim 10, wherein the specific port is to be used by the installed application or has restrictions on its use by the installed application.

17. The method according to claim 10,
wherein the setting unit is configured to include in the policy setting item at least the first port setting in accordance with the application specific port control information obtained by the obtaining unit and the second port setting relating to a port which is commonly used at least in the information processing apparatus.

18. The method according to claim 17, wherein the setting unit displays the policy setting item on a predetermined display screen, receives setting input with respect to the displayed policy setting item, and generates setting information according to the received setting input.

* * * * *